United States Patent [19]

Marx et al.

[11] Patent Number: 4,514,526

[45] Date of Patent: Apr. 30, 1985

[54] STORAGE-STABLE TRIS(HYDROXYALKYL)ISOCYANURATE POLYOL DISPERSIONS, PROCESS FOR THEIR PREPARATION AND THEIR UTILIZATION

[75] Inventors: Matthiäs Marx, Bad Durkheim; Helmut Ganss, Ludwigshafen; Wolfram Frank, Heidelberg, all of Fed. Rep. of Germany

[73] Assignee: BASF Aktiengesellschaft, Ludwigshafen, Fed. Rep. of Germany

[21] Appl. No.: 633,512

[22] Filed: Jul. 23, 1984

[30] Foreign Application Priority Data

Sep. 7, 1983 [DE] Fed. Rep. of Germany ....... 3332251

[51] Int. Cl.$^3$ .............................................. C08G 18/14
[52] U.S. Cl. .................................. 521/166; 252/182; 252/308; 252/352; 528/73
[58] Field of Search .................. 528/73; 252/182, 308, 252/352; 521/166

[56] References Cited

U.S. PATENT DOCUMENTS

| | | | |
|---|---|---|---|
| 3,088,948 | 5/1963 | Little et al. | 548/229 |
| 3,174,950 | 3/1965 | Cordier | 524/590 |
| 3,730,923 | 5/1973 | Farmaini et al. | 521/166 |
| 4,031,040 | 6/1977 | Otter et al. | 528/52 |

*Primary Examiner*—Maurice J. Welsh
*Attorney, Agent, or Firm*—Norbert M. Lisicki

[57] ABSTRACT

The invention relates to storage-stable tris(hydroxyalkyl)isocyanurate polyol dispersions containing (a) from 2 to 70 parts by weight tris(hydroxyalkyl)isocyanurate, (b) from 98 to 30 parts by weight of at least one polyol having a functionality of from 2 to 8 and a hydroxyl number from 20 to 1800, and (c) from 0 to 20 parts by weight of one or more dispersion stabilizers.

The dispersions are prepared by dissolving starting components A and B at temperatures in excess of 100° C., in some cases adding a dispersion stabilizer and/or crystallization accelerator, with continuous and stepwise cooling of the mixture while stirring. The products are utilized for the preparation of polyurethane plastics, in particular polyisocyanurate foams containing polyurethane or polyurethane groups.

11 Claims, No Drawings

STORAGE-STABLE TRIS(HYDROXYALKYL)ISOCYANURATE POLYOL DISPERSIONS, PROCESS FOR THEIR PREPARATION AND THEIR UTILIZATION

BACKGROUND OF THE INVENTION

1. Field of the Invention

The invention relates to storage-stable isocyanurate polyol dispersions. More particularly, the invention relates to storage-stable tris(hydroxyalkyl)isocyanurate polyol dispersions containing (a) from 2 to 70 parts by weight tris(hydroxyalkyl)isocyanurate, (b) from 98 to 30 parts by weight of at least one polyol having a functionality of from 2 to 8 and a hydroxyl number of from 20 to 1800 and, (c) from 0 to 20 parts by weight, preferably 0 to 5 parts by weight of one or more dispersion stabilizers.

2. Prior Art

Tris(2-hydroxyalkyl)isocyanurates and a process for their preparation are described in U.S. Pat. No. 3,088,948. The products are nearly insoluble in polyols and organic polyisocyanates at the processing temperatures used for the preparation of polyurethane plastics, in particular polyurethane foams, and therefore are not suitable as starting components for such applications.

However, in order to use tris(hydroxyalkyl)isocyanurates, in particular tris(2-hydroxyethyl)isocyanurate as starting components for polyurethane plastics, specified amounts of solvents or solubilizing agents are added to the polyurethane formulations. This means, though, that such systems can only be used as binders for coatings or paints.

Since it is known that tris(hydroxyethyl)isocyanurate provides polyurethane coatings with a good resistance to weathering and increases their flame resistance, there have been attempts to put the products into a more soluble form through suitable modifications.

In U.S. Pat. No. 3,730,923 the tris(2-hydroxyalkyl)isocyanurates are oxyalkylated with ethylene oxide, 1,2-propylene oxide, or 1,2-butylene oxide and the resulting tris(2-hydroxyalkyl)isocyanurate-alkylene oxide adducts are processed with organic polyisocyanates in the presence of blowing agents and catalysts to form polyurethane foams having improved characteristics.

U.S. Pat. No. 3,174,950 describes another possible way of improving the compatibility with polyols. This method consists of preparing the isocyanate-group-containing prepolymers from diphenylmethane diisocyanates and tris(2-hydroxyethyl isocyanurate) in organic solvents. The disadvantage of this process is that the modification results in additional equipment and process costs, that the properties of the tris(2-hydroxyalkyl)isocyanurates can be changed in an undesired manner, whereby particularly flame resistance is adversely affected, and that the range of possible final product characteristics is limited.

The subject of European Pat. No. 04 116 is a process for the preparation of cross-linked, dense or cellular polyurethane elastomers through the reaction of polyisocyanates with one or more polyols, whereby tris($\beta$-hydroxypropyl)isocyanurate or its ethoxylated derivatives are used as a polyol component. The resulting elastomers may be cellular and can be prepared in a one-shot or in a prepolymer process at temperatures from 75° to 150° C., whereby the starting components are mixed together and then immediately reacted or an isocyanate-group-containing prepolymer is prepared from the polyisocyanate, high molecular weight polyol, and, in some cases, tris($\beta$-hydroxypropyl)isocyanurate, and this prepolymer is then reacted with the remaining starting components. The polyol mixtures cited in the patent are not storage stable at room temperature. The publication does not teach how the polyol mixtures can be stabilized so that even after several weeks of storage they are only suitable for two-component processing.

DESCRIPTION OF THE PREFERRED EMBODIMENTS

The objective of the invention at hand was to convert tris(hydroxyalkyl)isocyanurates into a physical state in which they could be processed without additional modification and even after a storage period of several weeks and still with conventional reaction conditions into polyurethanes, in particular polyurethane- or polyurethane-group-containing polyisocyanate foams.

This objective was accomplished by dispersing tris(hydroxyalkyl)isocyanurates in polyols.

Hence, the subject of the invention is storagestable tris(hydroxyalkyl)isocyanurate-polyol dispersions containing (a) from 2 to 70 parts by weight, preferably from 10 to 40 parts by weight, tris(hydroxyalkyl)isocyanurate, in particular tris(hydroxyethyl)isocyanurate, (b) 98 to 30 parts by weight, preferably 90 to 60 parts by weight of at least one polyol having a functionality of from 2 to 8 and a hydroxyl number of from 20 to 1800, and (c) from 0 to 20 parts by weight, preferably from 0 to 5 parts by weight, of one or more dispersion stabilizers.

The storage-stable tris(hydroxyalkyl)isocyanuratepolyol dispersions contain the dispersed tris(hydroxyalkyl)isocyanurates at an average particle size of less than 0.5 mm, preferably less than 0.1 mm, and more preferably from 0.1 to 0.05 mm and smaller, and they have a tris(hydroxyalkyl)isocyanurate content of 20 weight percent based on the total weight at 25° C., a viscosity of from 50 to 150,000 mPas, preferably from 100 to 20,000 mPas.

The tris(hydroxyalkyl)isocyanurate-polyol dispersion of the invention did not exhibit any tris(hydroxyalkyl)isocyanurate sedimentation after storage times of more than three months and even at relatively high tris(hydroxyalkyl)isocyanurate concentrations they could be easily processed to produce polyurethanes on conventional multiple-component processing machines.

The following should be noted regarding the initial components used for preparing the tris(hydroxyalkyl)isocyanurate-polyol dispersions of the invention:

Typical tris(hydroxyalkyl)isocyanurates (a) are: tris($\beta$-hydroxybutyl)isocyanurate, tris($\beta$-hydroxypropyl)isocyanurate and preferably tris($\beta$-hydroxyethyl)isocyanurate.

For the storage-stable dispersions at conventional processing temperatures for polyurethanes, e.g., at from 10° to 100° C., preferably from 15° to 50° C., liquid polyols (b) having a functionality of from 2 to 8, preferably from 2 to 6, and a hydroxyl number of from 20 to 1800, preferably from 28 to 750, are suitable as the continuous phase, whereby polyols having a functionality of from 2 to 3 and a hydroxyl number of from 28 to 85 are preferable for the preparation of flexible elastic polyurethanes, polyols having the same functionality and a hydroxyl number of from 90 to 180 are preferable for semi-rigid polyurethanes, and polyols having a functionality of from 3 to 6 and a hydroxyl number of from 200 to 750 are preferable for rigid polyurethanes.

Polyester polyols and/or polyether polyols have proven to be particularly suitable for use as the polyol and are threfore preferably used. However, other hyroxyl-group-containing polymers having the functionalities and hydroxyl numbers cited above can also be used, for example polyester amides, polyacetals such as polyoxymethylenes and butanediol formals, and polycarbonates, in particular those produced from diphenyl carbonate and 1,6-hexanediol and/or 1,4-butanediol by means of transesterification.

For special application areas the polyols can be replaced partially by monofunctional primary and/or secondary hydroxyl group-containing organic compounds having molecular weights from 150 to 16,000. When such monofunctional hydroxyl-group-containing compounds are used, they are used in amounts from 1 to 30 weight percent, preferably from 2 to 15 weight percent based on the polyol weight.

Suitable polyester polyols can be prepared, for example, from dicarboxylic acids, preferably aliphatic dicarboxylic acids, having from 2 to 12, preferably 4 to 8, carbon atoms in the alkylene radical, and polyvalent alcohols having from 2 to 10, preferably 2 to 6, carbon atoms, in particular diols. Typical aliphatic dicarboxylic acids are pimelic acid, suberic acid, azelaic acid, sebacic acid, undecane dicarboxylic acid, dodecane dicarboxylic acid, and, preferably, succinic, glutaric, and adipic acid, and aromatic dicarboxylic acids such as phthalic acid and terephthalic acid. Examples of polyvalent, di- and trivalent alcohols are: 1,2- and 1,3-propylene glycol, dipropylene glycol, neopentyl glycol, 1,5-pentane diol, 1,8-octane diol, 1,10-decane diol, glycerine, trimethylolpropane, and preferably ethylene glycol, diethylene glycol, 1,4-butane diol, and 1,6-hexane diol.

The dicarboxylic acids and polyvalent alcohols can be used both individually and in the form of mixtures. Typical are polyester polyols based on adipic acid diethylene glycol, adipic acid hexane diol neopentyl glycol, adipic acid ethylene glycol butane diol, adipic, glutaric, succinic acid ethylene glycol diethylene glycol, etc.

The polyester polyols are generally di- to trifunctional and have hydroxyl numbers from 20 to 210, preferably from 28 to 110.

Preferably, however, polyether polyols prepared through known methods from one or more alkylene oxide units having from 2 to 4 carbon atoms in the alkylene radical and an initiator molecule containing in bonded form from 2 to 8, preferably 2 to 6, active hydrogen atoms are used for the polyether polyols. Suitable alkylene oxides are, for example, tetrahydrofuran, 1,3-propylene oxide, 1,2- and 2,3-butylene oxide, styrene oxide, and preferably ethylene oxide and 1,2-propylene oxide. The alkylene oxides can be used individually, alternately one after another, or as mixtures. Typical initiator molecules are, for example: water, dicarboxylic acids such as succinic acid, adipic acid, phthalic acid, and terephthalic acid, in some cases N-mono-, N,N- and N,N'-dialkyl-substituted diamines having from 1 to 4 carbon atoms in the alkyl radical such as, in some cases, mono- and dialkyl-substituted ethylene diamine, 1,2- and 1,3-propylene diamine, 1,4-butylene diamine, 1,6-hexamethylene diamine, and 4,4'-, 2,4'-, and 2,2'-diaminodiphenylmethane, 2,4- and 2,6-diaminotoluene, alkanolamines such as ethanolamine, diethanolamine, N-methyl- and N-ethyl diethanolamine and triethanolamine, ammonia, hydrazine, and polyvalent, preferably di- and trivalent, alcohols such as ethylene glycol, 1,2- and 1,3-propylene glycol, diethylene glycol, dipropylene glycol, 1,4-butylene glycol, 1,6-hexamethylene glycol, glycerine, trimethylolpropane, pentaerythritol, sorbitol and sucrose.

Di- to hexafunctional polyether polyols having hydroxyl numbers from 20 to 800, preferably from 28 to 750, which contain both ethylene oxide and 1,2-propylene oxide units in the oxyalkylene chain are preferably used, whereby such ethylene oxide and 1,2-propylene oxide units can be arranged either randomly or in blocks in the oxyalkylene chain. Di- and/or trifunctional polyether polyols having hydroxyl numbers from 28 to 600 and which preferably contain primary hydroxyl groups are desirable for use.

Polyether polyols of tetrahydrofuran or mixtures of tetrahydrofuran with the alkylene oxide units cited above can also be used.

Suitable monofunctional hydroxyl-group-containing organic compounds which may be used in a mixture with the polyols are, for example, hydroxyl-group-containing polyethers having molecular weights from 150 to 16,000, preferably from 400 to 4000, obtained through the reaction of the alkylene oxides described above with monofunctional initiator molecules. Typical monofunctional initiators are: low molecular weight monofunctional aliphatic alcohols having from 1 to 18, preferably from 1 to 6, carbon atoms in the alkyl radical, such as methanol, ethanol, propanol, butanol, hexanol, decanol, lauryl alcohol, neopentyl alcohol, ethylene hexanol, cyclohexanol, tert.-butylcyclohexanol, phenylethanol, and, preferably, allyl alcohol and methylbutanol; aromatic monohydroxyl compounds having from 6 to 24 carbon atoms such as phenol, naphthol, alkylated phenols such as cresol, trimethylphenol, nonylphenol, dodecylphenol, etc., and organic monocarboxylic acids having from 1 to 18 carbon atoms, such as acetic acid, propionic acid, butyric acid, ethylenehexanoic acid, acrylic acid, and similar compounds. The initiator molecules can also be used both individually and together as mixtures. Similarly, the alkylene oxides can be used for the polymerization either individually, alternatively one after another, or as mixtures. The polymerization of the alkylene oxides with the aid of the initiator molecules is performed under known reaction conditions, sometimes in the presence of conventional catalysts.

The tris(hydroxyalkyl)isocyanurate-polyol dispersions prepared in accordance with the invention having an average particle size of less than 0.5 mm for at least 90 percent of the tris(hydroxyalkyl)isocyanurate particles are already very storage stable. However, this effect can still be improved significantly by the addition of conventional stabilizers or specially selected stabilizers in amounts from 0.001 to 20 weight percent, preferably from 0.005 to 5 weight percent, based on the weight of the tris(hydroxyalkyl)isocyanurate. Particular success has been had with stabilizers selected from the group consisting of (c1) silicic acids and silicates (c2) salts, preferably alkali metal salts such as sodium or potassium salts, and ammonium salts of perfluorated alkyl carboxylic acids having from 4 to 20, preferably from 8 to 18 carbon atoms, salts of alkyl sulfonic acids or perfluorated alkyl sulfonic acids having from 4 to 20, preferably from 8 to 18 carbon atoms, as well as perfluorated polyether polyols having molecular weights from 300 to 6000, preferably from 500 to 4000, and/or (c3) salts of fatty alcohol sulfates having from 6 to 30, preferably from 8 to 22 carbon atoms.

Preferably, mixtures of at least one stabilizer from group (1) and/or at least one stabilizer from group (b) and/or at least one stabilizer from group (c) are utilized.

The silicic acids and silicates are used in amounts ranging from 0.01 to 20 weight percent, preferably from 0.05 to 5 weight percent, based on the tris(hydroxyalkyl)isocyanurate weight. The silicic acids can be prepared through flame hydrolysis or through precipitation. Silicic acids obtained by means of flame hydrolysis are commercially available, for example those marketed under the trademark Aerosil ®by Degussa, Frankfurt. Corresponding products have bulk densities from approximately 40 g/l to 60 g/l surface areas based on the BET method of approximately 130 to 410 $m^2/g$ (see Brunauer et al, *Journal American Chemical Society* 60, 309 [1938]), and they contain more than 99.8 percent $SiO_2$, <0.05 percent $Al_2O_3$, <0.003 percent $Fe_2O_3$, <0.03 percent $TiO_2$, and <0.025 percent HCl.

Precipitated silicic acids have tamped densities (per DIN 53 194) of from 70 to 200 g/l, surface areas determined with the BET method of from 160 to 650 $m^2/g$, and they contain 98 to 99.5 percent $SiO_2$, 0.2 percent $Al_2O_3$, 0.01 to 0.03 percent $Fe_2O_3$, and from 0.2 to 1.0 percent $Na_2O$.

Precipitated silicic acids are supplied, for example, by Degussa, Frankfurt, and are commerically available under the trade names silicic acid FK 320, FK 300, FK 310, FK 383, Sipenat ®and Durosil ®.

Suitable silicates have tamped densities (per DIN 53 194) of approximately 135 to 165 g/l, BET surface areas of from 35 to 100 $m^2/g$, and they contain approximately 66 to 91 percent $SiO_2$, 0.2 to 26 percent $Al_2O_3$, approximately 0.03 percent $Fe_2O_3$, and may contain approximately 6 percent CaO and approximately 2 to 8 percent $Na_2O$. Such products are produced by Degussa, Frankfurt, and are marketed under the designations Aluminum Silicate P 820, Transpafill ®, and Calsil ®.

The stabilizers of groups (b) and (c) are utilized in amounts ranging from 0.001 to 5 weight percent, preferably from 0.005 to 1 percent, based on the tris(hydroxyalkyl)isocyanurate weight. Typical examples are: potassium salts of perfluorinated alkyl carboxylic acids having from 4 to 20 carbon atoms such as perfluorinated caproic acid, perfluorinated enanthic acid, perfluorinated octanoic acid, perfluorinated pelargonic acid, perfluorinated capric acid, perfluorinated lauric acid, perfluorinated myristic acid, perfluorinated palmitic acid, perfluorinated stearic acid, perfluorinated oleic acid, perfluorinated linolic acid, perfluorinated linolenic acid, the potassium salts of, in some cases, perfluorinated alkylsulfonic acid having from 4 to 20 carbon atoms, such as perfluorinated butane-, perfluorinated hexane-, perfluorinated heptane-, perfluorinated octane-, perfluorinated dodecane-, and perfluorinated hexadecanesulfonic acid, and perfluorinated polyether polyols having molecular weights from 300 to 6000, such as the corresponding polymers of tetrafluoroethylene oxide and hexafluoropropylene oxide as well as salts of fatty alcohol sulfates such as sodium borosulfate.

Potassium perfluoroalkyl sulfonates, ammonium perfluoroalkyl carboxylates, calcium fluoroalkyl carboxylates, and fluorated alkyl polyoxyethylene ethanol are commercial products marketed by the 3M Company under the trademark Fluorad ®. Sodium salts of fatty alcohol sulfates, for example, laurylsulfate, are also obtainable, for example, under the trademark Duponol ® from the duPont Company.

In order to prepare the dispersions of the invention, the tris(hydroxyalkyl)isocyanurates (a) and polyols (b) are mixed together and heated in the presence or absence of dispersion stabilizers, generally for 1 to 300 minutes at temperatures exceeding 100° C., preferably from 101° to 220° C., more preferably from 110° to 140° C. until a clear solution has formed. If polyester polyols are used as the continuous phase, the mixtures of tris(hydroxyalkyl)isocyanurates and polyester polyols are thermally treated in a preferred embodiment of the process at temperatures exceeding 130° C., preferably from 130° to 190° C., for from 15 to 300 minutes, preferably for 30 to 180 minutes long, preferably in the absence of dispersion stabilizers. The solution is allowed to cool continuously or, preferably, in steps while mixing at low shear rates. The cooling time ranges from 0.5 to approximately 20 hours, preferably from 0.5 to 5 hours. The particle size of the crystallizing tris(hydroxyalkyl)isocyanurates can be controlled by altering the cooling rate, and, if desired, by inserting hold points, thus influencing to a certain extent the viscosity and storage stability of the dispersions of the invention. The cited dispersion properties can also be affected by the type and composition of the polyols or polyol mixture used.

In a preferred embodiment at least one organic and/or inorganic crystallization accelerator is incorporated in the solution of starting components (a) and (b) and, in some cases (c), at a temperature above the demulsification temperature of the tris(hydroxyalkyl)isocyanurates and polyols and below the melting point of the crystallization accelerator in amounts ranging from 0.01 to 3.0 weight parts per 100 weight parts solution. Said temperature range is determine experimentally depending on the starting components which are used. Preferably, crystalline tris(hydroxyalkyl)isocyanurates or, more preferably, already prepared dispersions of the same starting components (a) and (b) are used as crystallization accelerators. Suitable crystallization accelerators are also, for example: talcum, methylstearates, for example zinc, calcium, and/or magnesium stearate, and other nucleating agents.

In a different version of the process, the tris(hydroxyalkyl)isocyanurate (a) is first crystallized out of part of the polyol and the resulting dispersion is then diluted at temperatures under 100° C. with the remaining portion of the same polyol (b) or with a different (b) polyol.

In preparing the dispersions of the invention, it is also important that the melting point of the crystalline tris(hydroxyalkyl)isocyanurates (a) lies below the demulsification temperature of the solution of components (a) and (b). Otherwise coarse grained solid particles can form. Such particles make it difficult or even impossible to process the dispersion.

The dispersions of the invention can be prepared discontinuously in mixed vessels or continuously in a cascade of mixed vessels.

The tris(hydroxyalkyl)isocyanurate-polyol dispersions of the invention can also be prepared by means of reducing the size of the crystalline tris(hydroxyalkyl)isocyanurates particles in situ in the polyols, if desirable in the presence of dispersion stabilizers, with localized energy densities from 36 to 10,800 $MJ/m^3$, preferably from 72 to 3600 $MJ/m^3$.

Tris(hydroxyalkyl)isocyanurate, polyol, and, if desired, dispersion stabilizers can be mixed together and particle size can be reduced at temperatures from 10° to 95° C., preferably from 30° to 90° C., generally in from 1 to 10, preferably 2 to 6, passes through the size reduction equipment in situ to the desired particle size and hereby dispersed at the same time. To do this, for example, the entire amount of tris(hydroxyalkyl)isocyanurate can be mixed with the entire amount of polyol and stabilizer at temperatures from 10° to 30° C. However, the total amount of polyol can also be mixed with a portion of the tris(hydroxyalkyl)isocyanurate and stabilizer and this mixture can be reduced in size until a specified particle size is reached and then incorporated into the remaining tris(hydroxyalkyl)isocyanurate and further reduced in size, or part of the polyol can be ground in the presence of the dispersion stabilizer with the entire amount of tris(hydroxyalkyl)isocyanurate and during the course of the grinding operation, additional polyol and, if necessary, dispersion stabilizer can be added.

The size reduction can be performed in, for example, mechanical dispersing equipment, preferably in dispersing machines which have high localized energy densities and utilize grinding media, for example stirred ball mills, sand mills, Netsch mills, Perl mills, Dyno mills, Planetary ball mills, and vessel-type mills. Preferred grinding media are spherical in shape and can be of glass, ceramic, metal, hard abrasion resistant plastic, e.g., polyamide, and whose diameter is from 0.2 to 8, preferably from 0.4 to 5 mm.

The tris(hydroxyalkyl)isocyanurate polyol dispersions of the invention are suitable polyol components for the preparation of dense, microcellular, or expanded polyurethane, polyisocyanurate, and/or polycarbodiimide-group-containing plastics. Preferably they are used to produce polyurethane- and/or polyurethane-group-containing polyisocyanurate foams. Formulations prepared with the dispersions of the invention are characterized by particularly good rheology combined with thorough curing.

Compared with polyurethanes or polyurethane-group-containing polyisocyanurates prepared from conventional polyols, the plastics prepared utilizing the dispersions of the invention exhibit numerous advantages, some of which are: the flame resistance of the resultant plastics is improved decisively with or without the use of additional conventional flame retardants such as halogen- and/or phosphorous-containing compounds. The foams have a fine, uniform cell structure, which improves thermal insulation. The polyurethane-group-containing polyisocyanurate foams have relatively high wear resistance. When high-volume slab foams are produced, the heat generated in the center of the foam block is lowered considerably, which reduces the danger of core scorching.

In order to prepare the preferably expandable polyurethane- or polyurethane-group-containing polyisocyanurate, other familiar starting components such as polyols, organic polyisocyanates, catalysts, if desired blowing agents, chain extenders, auxiliaries, and additives can be used in addition to the tris(hydroxyalkyl)isocyanurate-polyol dispersions of the invention.

The tris(hydroxyalkyl)isocyanurate-polyol dispersions of the invention can be utilized directly as polyols. However, the dispersions can also be mixed with identical or different conventional polyols and adjusted to the desired solids content. Here conventional polyols as understood by the invention are those described at the beginning of the specifications as being used to prepare the tris(hydroxyalkyl)isocyanurate-polyol dispersions.

For example, aliphatic, cycloaliphatic, and aromatic polyvalent, preferably divalent isocyanates are suitable for use as the polyisocyanates. Typical examples are: aliphatic diisocyanates such as ethylene diisocyanate, 1,4-tetramethylene diisocyanate, 1,6-hexamethylene diisocyanate, and 1,12-dodecane diisocyanate; cycloaliphatic diisocyanates such as 1,3- and 1,4-cyclohexane diisocyanate as well as various mixtures of these isomers, 1-isocyanato-3,3,5-trimethyl-5-isocyanatomethyl cyclohexane, 2,4- and 2,6-hexahydrotoluene diisocyanate as well as various mixtures of these isomers, 4,4'- and 2,4'-diisocyanato-dicyclohexylmethane, aromatic diisocyanates such as 1,3- and 1,4-phenylene diisocyanate, 2,4- and 2,6-toluene diisocyanate, as well as various mixtures of these isomers, 2,2'-, 2,4'-, and 4,4'-diphenylmethane diisocyanate, and 1,5-naphthalene diisocyanate; aromatic polyisocyanates such as 4,4'4''-triphenylmethane triisocyanate, 2,4,6-triisocyanato-benzene and polyphenyl polymethylene polyisocyanates. In addition, modified polyisocyanates can be used, for example, carbodiimide-group-containing polyisocyanates (German Pat. No. 10 92 007), allophonate-group-containing polyisocyanates (GB Pat. No. 994,890; BE Pat. No. 761,626), isocyanurate-group-containing polyisocyanates (German Pat. Nos. 10 22 789, 12 22 067, 10 27 394, German Offenlegungsschrift No. 19 29 034, and German Offenlegungsschrift No. 20 04 048), urethane-group-containing polyisocyanates (BE Pat. No. 752,261, U.S. Pat. No. 3,394,164), biuret group-containing polyisocyanates (German Pat. No. 11 01 394, GB Pat. No. 889,050), and ester-group-containing polyisocyanates (GB Pat. No. 965,474, GB Pat. No. 10 72 956, U.S. Pat. No. 3,567,763, and German Pat. No. 12 31 688).

Preferred are the commercially easily obtainable aromatic di- and polyisocyanates, such as 2,4- and 2,6-toluene diisocyanate as well as various mixtures of these isomers, 2,2'-, 2,4'-, and 4,4'-diphenylmethane diisocyanate as well as various mixtures of these isomers, mixtures of 2,2'-, 2,4'-, 4,4'-diphenylmethane diisocyanates and polyphenyl polymethylene polyisocyanates (polymeric MDI), mixtures of 2,4- and 2,6-toluene diisocyanates and polymeric MDI as well as corresponding polyisocyanates modified with carbodiimide, urethane, allophonate, isocyanurate, urea, and/or biuret groups. The cited di- and polyisocyanates can be utilized individually or in the form of mixtures.

Suitable catalysts for accelerating the formation of polyurethane between the polyols, the water, if desired, chain extenders, and the polyisocyanates are, for example, tertiary amines such as dimethylbenzylamine, N,N,N',N'-tetramethyldiamino ethylate, bis(dimethylaminopropyl)urea, N-methyl- and N-ethyl morpholine, dimethylpiperazine, 1,2-dimethylimidazole, 1-azobicyclo-(3,3,0)octane and, preferably, triethylenediamine, metal salts such as tin dioctoate, lead octoate, tin diethyl hexoate, and, preferably, tin(I)-salts such as dibutyl tin dilaurate, dibutyl tin diacetate, tetrabutyl tin disulfide, and bis(tri-n-butyl tin)oxide, as well as, more preferably, mixtures of tertiary amines and organic tin salts, preferably from 0.1 to 5.0 weight percent catalyst based on tertiary amines and/or from 0.01 to 1.0 weight percent metal salts are used based on the total weight of the hydroxyl-group-containing compounds.

Conventional cyclization and polymerization catalysts for polyisocyanates have proven to be successful in preparing polyurethane group-containing polyisocyanurate foams. Typical examples are: strong bases such as quaternary ammonium hydroxides, for example benzyltrimethyl ammonium hydroxide; alkali metal hydroxides, for example sodium or potassium hydroxides; alkali metal alkoxides, for example sodium methylate and potassium isopropylate; trialkylphosphines, for example triethylphosphine; alkylaminoalkylphenols, for example 2,4,6-tris(dimethylaminoethyl)-phenol; 3- and/or 4-substituted pyridines, for example 3- or 4-methylpyridine; metal organic salts, for example tetrakis(hydroxyethyl)sodium borate; Friedel-Crafts catalysts, for example aluminuim chloride, iron(III)-chloride, boron fluoride and zinc chloride, and alkali metal salts of weak organic acids and nitrophenolates, for example potassium octoate, potassium 2-ethyl hexoate, potassium benzoate, sodium picrate, and potassium phthalimide. Preferably the highly basic N,N',N''-tris(-dialkylaminoalkyl)-s-hexahydrotriazines are used, for example, N,N',N''-tris(dimethylaminopropyl)-s-hexahydrotriazine.

The amount of catalyst suitable for preparing the polyurethane-group-containing polyisocyanurate foams depends on the effectiveness of the catalyst being used. Generally it is desirable to use from 1 to 15 weight parts, preferably from 3.5 to 10 weight parts catalyst per 100 weight parts organic polyisocyanate.

Among the blowing agents which can be used to prepare polyurethane or polyurethane-group-containing polyisocyanurate foams is water, which reacts with the isocyanate groups to form carbon dioxide. The amounts of water which are most effectively used range from 0.1 to 3 weight percent based on the weight of polyisocyanate. However, larger amounts of water can also be used if necessary.

Other blowing agents which can be used are low-boiling-point liquids which evaporate as a result of the exothermic polyaddition/polymerization reaction. Suitable are liquids which are inert relative to the organic polyisocyanate and have boiling points less than 100° C. Typical examples of such liquids which may be used are halogenated hydrocarbons such as methylene chloride, trichlorofluoromethane, dichlorodifluoromethane, dichloromonofluoromethane, dichlorotetrafluoroethane, and 1,1,2-trichloro-1,2,2-trifluoroethane. Mixtures of these low boiling point liquids with one another and/or with other substituted or nonsubstituted hydrocarbons can also be utilized.

The most efficacious amount of low boiling point liquid required to prepare the foam depends on the foam density one wishes to achieve as well as on the amount of water also being used. In general, from 5 to 40 weight percent, based on 100 weight percent organic polyisocyanate, gives satisfactory results.

In some cases, it is also desirable to utilize chain extenders and cross-linking agents in addition to the higher molecular weight polyols in order to prepare the sometimes expanded polyurethanes or polyurethane-group-containing polyisocyanurates. The chain extenders have molecular weights less than 1000, preferably from 30 to 600, and preferably have two active hydrogen atoms. Typical chain extenders are, for example, aliphatic and/or aromatic diols having from 2 to 14, preferably from 2 to 6 carbon atoms, such as propanediol, pentanediol, 1,6-hexanediol, and, preferably, ethanediol, diethylene glycol, 1,4-butanediol, and bis(2-hydroxyethyl)hydroquinone, diamines such as ethylenediamine and, in some cases, 3,3'- respectively 3,3',5,5'-di- respectively tetraalkyl- or halogen-substituted 4,4'-diaminodiphenylmethanes, isophoronediamine, ethanolamine. Suitable cross-linking agents are, for example, triethanolamine and trifunctionality alcohols such as glycerine, trimethylolpropane, and low molecular weight hydroxyl-group-containing polyalkylene oxides of ethylene oxide and/or 1,2-propylene oxide and the previously cited diols, triols, diamines, and/or alkanolamines. Additives can also be incorporated in the reaction mixture. Typical additives are surfactant foam stabilizers, agents to protect against hydrolysis, pour regulators, fungistatic and bacteriostatic substances, colorants, pigments, flame retardants, light stabilizers, and antioxidizing agents. For example, surfactants may be used to assist in homogenizing the initial components and which may also be suitable for regulating the structure of the foam cells. Typical surfactants are, for example, siloxane-oxyalkylene heteropolymers and other organopolysiloxanes, oxyethylated alkyl phenols, oxyethylated fatty alcohols, paraffin oils, ricinoleic or ricinoleic esters, and Turkey red oil, which are used in amounts from 0.2 to 6 weight parts per 100 weight parts polyisocyanate.

In addition to the tris(hydroxyalkyl)isocyanurates, further suitable flame retarding agents can be incorporated in the expandable reaction mixture.

Further information on the conventional additives cited above can be obtained from the literature, for example, the monograph by J. H. Saunders and K. C. Frisch, *High Polymers*, vol. XVI, *Polyurethanes*, pts. 1 and 2, Interscience Publishers, 1962/1964.

As already described, the tris(hydroxyalkyl)isocyanurate-polyol dispersions can be diluted with the polyols cited above to prepare the sometimes expanded polyurethane plastics and can, therefore, be adjusted to achieve the most advantageous solids content.

In order to prepare the polyurethane foams, the polyisocyanates and dispersions or mixtures of dispersions, polyols, and chain extenders and/or cross-linking agents must be reacted in such amounts that the ratio of Zerevitinoff-active hydrogen groups-to-isocyanate groups is from 1:0.8 to 1:2.5, preferably from 1:0.9 to 1:1.2, more preferably approximately 1:1, and that the tris(hydroxyalkyl)isocyanurate content in the expandable mixture is from 5 to 40 weight percent, preferably from 10 to 20 weight percent, based on the weight of the polyisocyanate polyol mixture.

In order to prepare the polyisocyanurate foams, it has been found to be desirable to have the proportion of isocyanate groups in the polyisocyanate to hydroxyl groups in the polyols be from 2:1 to 60:1, preferably from 2:1 to 10;1. The tris(hydroxyalkyl)isocyanurate content is from 3 to 40 weight percent, preferably from 10 to 20 weight percent based on the total content of polyisocyanate and polyol.

In some cases expanded polyurethane or polyurethane-group-containing polyisocyanurate plastics are prepared using a prepolymer process, however, a one-shot process is preferred. In this process, the polyisocyanates are intensively mixed with the tris(hydroxyalkyl)isocyanurate-polyol dispersion or mixtures of the dispersion and polyols, catalysts, blowing agents, and, in some cases, chain extenders and additives in the desired quantitative ratios at temperatures from 0° to 50° C., preferably from 15° to 40° C., and the reaction mixture is allowed to expand in open or closed molds, which may, in some cases, be temperature controlled, and, in some cases, with additional mold compression.

The tris(hydroxyalkyl)isocyanurate polyol dispersions of the invention are preferably used for preparing flexible slab foams since in this use they have a cell-opening effect in addition to the improved flame resistance. When allowed to expand in an unencumbered manner, the polyurethane foams exhibit densities of from 10 to 300 g/l, whereby the flexible polyurethane foams have densities of from 10 to 60 g/l, the semirigid foams have densities from 60 to 130 g/l, and the integral-skin polyurethane foams have densities from 60 to 80 g/l. The polyurethane foams are characterized in particular by their highly open-celled properties, good compression hardnesses, and their flame resistance. They are utilized, among other areas, for sound and thermal insulation in construction materials. The products are preferably used for upholstery foams, for protective coverings, and for shoe soles, upholstery arms, head supports, seat cushions, etc. The polyisocyanurate foams have densities from 5 to 100 g/l, preferably from 10 to 50 g/l, based on their excellent insulating properties, they are particularly well suited for double sheet elements.

All parts cited in the Examples are parts by weight.

EXAMPLE 1

A mixture of 83.3 parts of a diethylene glycol phthalate having a hydroxyl number of 250 and 16.7 parts tris($\beta$-hydroxyethyl)isocyanurate were heated to 120° C. while stirring. A clear solution resulted which was allowed to cool to 20° C. while stirring continuously over a period of 60 minutes. The resulting dispersion had a hydroxyl number of 312, a viscosity at 25° C. of 19,000 mPas, and an average particle size of less than 0.5 mm. The dispersion was storage-stable over a period of greater than three months.

EXAMPLE 2

A mixture of 78 parts of a polyether polyol based on sucrose and 1,2-propylene oxide having an average functionality of 4.0 and a hydroxyl number of 400 and 22 parts tris($\beta$-hydroxyethyl)isocyanurate were heated to 135° C. while stirring. The result was a clear solution which was allowed to cool to 110° C. over a period of 30 minutes while stirring. At this temperature the dispersed phase began to precipitate and the liquid became cloudy. The mixture was stirred at approximately 400 rpm for one hour at 110° C. and then the dispersion was gradually cooled to 20° C. over a period of 50 minutes. The resulting dispersion had a hydroxyl number of 450, a viscosity at 25° C. of 12,000 mPas, and an average particle size of <0.3 mm. The dispersion was storage stable for more than four months.

EXAMPLE 3

A process identical to that described in Example 2 was used, however, the clear solution was allowed to cool continuously from 135° C. to 20° C. during a period of one hour while stirring.

The resulting dispersion had a hydroxyl number of 450, a viscosity at 25° C. of 20,600, and an average particle size of 0.4 mm. It was storage stable for more than three months.

EXAMPLE 4

Preparation of a polyurethane-group-containing polyisocyanurate foam

A Component: mixture comprising 75 parts of the dispersion of Example 1, 25 parts of a polyether polyol based on sucrose and 1,2-propylene oxide having an average functionality of 4.0 and a hydroxyl number of 400, 1.0 parts of a stabilizer based on silicone (Tegostab®B 1903, Goldschmidt, Essen), 0.8 parts dimethylcyclohexylamine, 2.2 parts of a 47 weight percent solution of potassium acetate in ethylene glycol, and 33 weight percent trichlorofluoromethane.

B Component: mixture of diphenylmethane diisocyanates and polyphenylpolymethylene polyisocyanates having an isocyanate content of 31 weight percent.

One hundred thirty-seven parts of the A component and 213 parts of the B component were mixed intensively at 23° C. for 10 seconds, the mixture was fed into a mold and allowed to expand in the open mold. The resulting foam had the density of 40 g/l. The cream time was 18 seconds, the tack-free time was 38 seconds, and the rise time was 60 seconds.

The foam achieved class B2 in the DIN 4102 burn test as described below:
Edge flame propagation: 9 to 11 cm
Surface flame propagation: 11 to 13 cm.

The maximum reaction temperature in the core of a two-liter foam block was 137° C.

COMPARISON EXAMPLE A

The procedure from Example 4 was used, however, instead of 75 parts of the dispersion of Example 1, 75 parts diethylene glycol phthalate having a hydroxyl number of 250 was used for the A component. Corresponding to the changed hydroxyl number, only 185 parts of the B component were used.

The result was a foam having a density of 41.3 g/l with comparable cream, tack-free and rise times.

The B2 classification was just met in the DIN 4102 burn test, with the following characteristics:
Edge flame propagation: 13 cm, edge continues to burn
Surface flame propagation: 13 to 15 cm.

The maximum reaction temperature in the core of a block having a foam volume of 2 liters was 151° C.

EXAMPLE 5

Preparation of a polyurethane-group-containing polyisocyanurate foam

A Component: mixture comprising 90 parts of the dispersion of Example 1, 10 parts of a polyether polyol based on sucrose and 1,2-propylene oxide having a hydroxyl number of 400 and a functionality of 4.0, 1.0 parts of a stabilizer based on silicone (Tegostab®B 1903), 0.8 parts dimethylcyclohexylamine, 1.4 parts of a 47 weight percent solution of potassium acetate in diethylene glycol, and 20 weight parts trichlorofluoromethane.

B Component, as in Example 4: 123.2 parts of A component and 205 parts B component (index 250) were mixed intensively for 10 seconds at 23° C. The mixture was placed in a mold and allowed to expand in the open mold. The resulting foam had a density of 60.9 g/l. The cream time was 22 seconds, the tack-free time was 38 seconds, and the rise time was 116 seconds.

The B2 classification was just met in the DIN 4102 burn test, with the following characteristics:
Edge flame propagation: 9 to 11 cm
Surface flame propagation: 11 to 13 cm.

The maximum reaction temperature in the core of a block having a foam volume of 2 liters was 158° C.

COMPARISON EXAMPLE B

A Component: mixture comprising 90 parts of a diethylene glycol phthalate having a hyroxyl number of 250, 10 parts of a polyether polyol based on sucrose and 1,2-propylene oxide having a functionality of 4.0 and a hydroxyl number of 400, 1.0 parts of a silicone-based stabilizer (Tegostab®B 1903), 0.8 parts dimethylcyclohexylamine, 1.4 parts of a 47 weight percent solution of potassium acetate in diethylene glycol, and 16 weight parts tricylorofluoromethane.

B Component, as in Example 4: 119.2 parts of the A component and 160 parts of the B component (index 250) were expanded as in Example 5.

The resulting foam had a density of 60 g/l. The cream time was 17 seconds, the tack-free time 35 seconds, and the rise time 65 seconds.

In the DIN 4102 burn test the foam did not meet class B2, since both edge and surface flame propagation was greater than 15 cm.

The maximum reaction temperature in the core of a block having a foam volume of 2 liters was 171° C.

EXAMPLE 6

Preparation of a polyurethane-group-containing polyisocyanurate foam

A Component: similar to Example 5, although the amounts of the following initial components were changed: 1.7 parts silicone-based stabilizer (Tegostab®B 1903), 1.0 parts of a 47 weight percent solution of potassium acetate in diethylene glycol, and 23 parts trichlorofluoromethane.

B Component: as in Example 4. One hundred twenty-six parts of the A component and 123 parts of the B component (index 150) were expanded as in Example 5.

The resulting foam had a density of 40 g/l. The cream time was 20 seconds, the tack-free time 40 seconds, and the rise time 60 seconds.

The B2 classification was just met in the DIN 4102 burn test, with the following characteristics:
Edge flame propagation: 13 to 15 cm
Surface flame propagation: 13 to 15 cm.

COMPARISON EXAMPLE C

A Component: similar to Comparison Example B, however, the amounts of the following components were changed: 1.0 parts of a 47 weight percent solution of potassium acetate and diethylene glycol and 21 parts trichlorofluoromethane.

B Component: as in Example 4. 123.8 parts of the A Component and 96 parts of the B component (index 150) were expanded as in Example 5.

The resulting foam had a density of 40 g/l. The cream time was 19 seconds, the tack-free time 38 seconds, and the rise time 60 seconds.

Class B2 was not achieved in the DIN 4102 burn test, since the foam burned up in the surface and edge exposure tests.

EXAMPLE 7

The same procedure as used in Example 1 was followed, however, the clear solution was allowed to cool from 120° C. to 90° C. over a period of 30 minutes. At this temperature a portion of a Transpafill diethylene glycol phthalate dispersion having a silicate content of 20 weight percent and a primary particle size of 36 nm was added to the solution. This seeding produced a slight turbidity.

The seeded solution was stirred for four hours at 90° C. at a speed of 400 rpm then the dispersion was allowed to cool to 23° C. for a period of two hours while stirring.

The resulting dispersion, which was storage stable for at least six months, had a hydroxyl number of 320, a viscosity at 25° C. of 20,000 mPas and an average particle size of less than 0.1 mm.

EXAMPLE 8

A mixture of 83.3 parts of a diethylene glycol phthalate having a hydroxyl number of 250 and 16.7 parts tris(β-hydroxyethyl)isocyanurate were stirred for one hour in a nitrogen atmosphere at 180° C. The result was a clear solution which was allowed to cool to 90° C. with continuous stirring. At this temperature the solution was seeded with a portion of a dispersion of 80 parts diethylene glycol phthalate and 20 parts tris(β-hydroxyethyl)isocyanurate having an average particle size of 0.05 mm and which was prepared in six grinding passes. This produced a slight cloudiness in the reaction solution.

The seeded solution was stirred for four hours at 90° C. as in Example 7. Then the dispersion was allowed to cool to 23° C. over a period of two hours while stirring.

The resulting dispersion, which was storage stable for more than four months, had a hydroxyl number of 320, a viscosity at 25° C. of 24,000 mPas and an average particle size of less than 0.1 mm.

EXAMPLE 9

The procedure used in Example 1 was followed, however, the clear solution was allowed to cool from 120° C. to 90° C. while stirring slowly (100 rpm) over a period of 30 minutes.

At 90° C. the solution was seeded with a portion of a dispersion of 80 parts diethylene glycol phthalate and 20 parts tris(β-hydroxyethyl)isocyanurate prepared in six grinding passes and having an average particle size of 0.05 mm.

The slightly turbid solution was allowed to cool from 90° C. to 25° C. over a period of three hours with slow stirring (100 rpm).

The resulting dispersion had a hydroxyl number of 320, a viscosity at 25° C. of 38,300 mPas, and an average particle size less than 0.05 mm. The dispersion was storage stable for at least six months.

The embodiments of the invention in which an exclusive privilege or property is claimed are defined as follows:

1. Storage-stable tris(hydroxyalkyl)isocyanurate polyol dispersions containing
    (a) from 2 to 70 parts by weight tris(hydroxyalkyl)isocyanurate,
    (b) from 98 to 30 parts by weight of at least one polyol having a functionality of from 2 to 8 and a hydroxyl number from 20 to 1800, and
    (c) from 0 to 20 parts by weight of a dispersion stabilizer.

2. The storage-stable tris(hydroxyalkyl)isocyanurate polyol dispersions of claim 1 wherein the tris(hydroxyalkyl)isocyanurates possess an average particle size less than 0.5 mm.

3. The storage-stable tris(hydroxyalkyl)isocyanurate polyol dispersions of claim 1 wherein the dispersions having a tris(hydroxyalkyl)isocyanurate content of 20 percent by weight based on the total weight possess a viscosity of from 50 to 150,000 mPas at 25° C.

4. The storage-stable tris(hydroxyalkyl)isocyanurate polyol dispersions of claim 1 wherein tris(hydroxyethyl)isocyanurate is used as the tris(hydroxyalkyl)isocyanurate.

5. The storage-stable tris(hydroxyalkyl)isocyanurate polyol dispersions of claim 1 wherein polyester polyols and/or polyether polyols are used as the polyols.

6. The storage-stable tris(hydroxyalkyl)isocyanurate polyol dispersions of claim 1 wherein compounds selected from the group consisting of
   (c1) silicic acids and silicates,
   (c2) salts of perfluorinated alkylcarboxylic acids having from 4 to 20 carbon atoms, salts of alkylsulfonic acids or perfluorinated alkylsulfonic acids having from 4 to 20 carbon atoms, perfluorinated polyether polyls having molecular weights from 300 to 6000, and/or
   (c3) salts of fatty alcohol sulfates having from 6 to 30 carbon atoms
are used as the dispersion stabilizers.

7. A process for the preparation of storage-stable tris(hydroxyalkyl)isocyanurate polyol dispersions wherein
   (a) from 2 to 70 parts by weight tris(hydroxyalkyl)isocyanurate is dissolved in
   (b) from 98 to 30 parts by weight of at least one polyol having a functionality from 2 to 8 and a hydroxyl number of from 30 to 1800 in the presence of
   (c) from 0 to 20 parts by weight of a dispersion stabilizer at temperatures in excess of 100° C., and the resulting solution is allowed to cool continuously or in graduated steps accompanied by stirring.

8. The process of claim 7 wherein starting components (a) and (b) as well as, in some cases, (c) are dissolved at temperatures from 101° to 220° C., from 0.01 to 3.0 parts by weight of at least one organic and/or inorganic crystallization accelerator per 100 parts by weight solution is incorporated into the solution at a temperature in excess of the separation temperature of starting components (a) and (b), and the mixture is allowed to cool.

9. A process for the preparation of storage-stable tris(hydroxyalkyl)isocyanurate polyol dispersion with an average particle size less than 0.5 mm wherein
   (a) from 2 to 70 parts by weight tris(hydroxyethyl)isocyanurate is dissolved in
   (b) from 98 to 30 parts by weight of a polyether polyol and/or a polyester polyol having a functionality of from 2 to 8 and a hydroxyl number of from 20 to 1800 at temperatures from 101° to 140° C. in the presence of
   (c) from 0 to 5 parts by weight of a dispersion stabilizer, whereby from 0.01 to 3.0 parts by weight of at least one organic and/or inorganic crystallization accelerator per 100 parts by weight solution is incorporated into the solution at a temperature in excess of the separation temperature of starting components (a) and (b), and the mixture is allowed to cool gradually or in steps accompanied by mixing.

10. A polyurethane product prepared by reacting the product of claim 1 with an organic polyisocyanate.

11. A polyurethane group-containing polyisocyanate product prepared by reacting the product of claim 1 with an organic polyisocyanate.

* * * * *